(12) United States Patent
Niezrecki et al.

(10) Patent No.: US 12,022,197 B2
(45) Date of Patent: Jun. 25, 2024

(54) IMAGE CAPTURING SYSTEM, METHOD, AND ANALYSIS OF OBJECTS OF INTEREST

(71) Applicant: University of Massachusetts, Boston, MA (US)

(72) Inventors: Christopher Niezrecki, Merrimack, NH (US); Alessandro Sabato, Lowell, MA (US)

(73) Assignee: University of Massachusetts, Boston, MA (US)

( * ) Notice: Subject to any disclaimer, the term of this patent is extended or adjusted under 35 U.S.C. 154(b) by 860 days.

(21) Appl. No.: 16/969,266

(22) PCT Filed: Feb. 9, 2019

(86) PCT No.: PCT/US2019/017386
§ 371 (c)(1),
(2) Date: Aug. 12, 2020

(87) PCT Pub. No.: WO2019/160778
PCT Pub. Date: Aug. 22, 2019

(65) Prior Publication Data
US 2021/0006725 A1    Jan. 7, 2021

Related U.S. Application Data

(60) Provisional application No. 62/630,430, filed on Feb. 14, 2018.

(51) Int. Cl.
*H04N 23/695* (2023.01)
*B64C 39/02* (2023.01)
(Continued)

(52) U.S. Cl.
CPC ......... *H04N 23/695* (2023.01); *B64C 39/024* (2013.01); *H04N 5/0733* (2013.01);
(Continued)

(58) Field of Classification Search
CPC .... H04N 23/695; H04N 5/0733; H04N 23/66; H04N 2013/0081; H04N 13/239;
(Continued)

(56) References Cited

U.S. PATENT DOCUMENTS 10,791,319 B1 * 9/2020 Chui ..................... G06T 17/00
2011/0074926 A1 * 3/2011 Khan ................. H04N 13/246
348/46

(Continued)

FOREIGN PATENT DOCUMENTS

CN        111754584 A  * 10/2020
WO        2017197556 A1    11/2017

OTHER PUBLICATIONS

International Search Report, PCT/US2019/017386, dated Jun. 11, 2019, pp. 1-15.

*Primary Examiner* — Timothy J Henn
(74) *Attorney, Agent, or Firm* — Armis IP Law, LLC

(57) ABSTRACT

A first image sensor device is operable to produce first orientation information indicating an orientation of the first image sensor device at a time of capturing a first image of an object. A second image sensor device is operable to produce second orientation information indicating an orientation of the second image sensor device at a time of capturing a second image of the object. The image capturing system further includes measurement hardware to measure a distance between the first image sensor device and the second image sensor device at times of capturing the first image and the second image. According to one configuration, a combination of the first orientation information, the second orientation information, and the distance between the first image sensor device and the second image sensor device is used to derive a 3-D stereo view of the object using the first image and the second image.

31 Claims, 10 Drawing Sheets

(51) Int. Cl.
  *B64U 101/30* (2023.01)
  *H04N 5/073* (2006.01)
  *H04N 23/66* (2023.01)
  *H04W 4/029* (2018.01)

(52) U.S. Cl.
  CPC ............ *H04N 23/66* (2023.01); *H04W 4/029* (2018.02); *B64U 2101/30* (2023.01)

(58) Field of Classification Search
  CPC ............... H04N 13/296; B64C 39/024; H04W 4/029; B64U 2101/30; G01C 11/02; G01C 11/34
  See application file for complete search history.

(56) References Cited

U.S. PATENT DOCUMENTS

| | | | |
|---|---|---|---|
| 2012/0007943 A1* | 1/2012 | Tytgat | G01B 11/22 |
| | | | 348/E7.083 |
| 2014/0056470 A1 | 2/2014 | Khawand et al. | |
| 2014/0286566 A1* | 9/2014 | Rhoads | G06T 3/4038 |
| | | | 382/154 |
| 2016/0297545 A1 | 10/2016 | Yang et al. | |
| 2017/0195549 A1 | 7/2017 | Cao et al. | |
| 2017/0301111 A1 | 10/2017 | Zhao et al. | |
| 2018/0128620 A1* | 5/2018 | Liu | G01S 19/48 |
| 2019/0196513 A1* | 6/2019 | Zhou | G05D 1/104 |
| 2020/0084432 A1* | 3/2020 | Ravirala | H04N 13/271 |

\* cited by examiner

IMAGE CAPTURING SYSTEM, METHOD, AND ANALYSIS OF OBJECTS OF INTEREST

RELATED APPLICATIONS

This application is a national stage filing of PCT application No. PCT/US19/17386 filed Feb. 9, 2019 entitled IMAGE CAPTURING SYSTEM AND ANALYSIS OF OBJECTS OF INTEREST, which claims priority to U.S. Provisional Patent Application No. 62/630,430 filed Feb. 14, 2018 entitled IMAGE CAPTURING SYSTEM AND USE OF ONE OR MORE MOBILE IMAGE SENSOR DEVICES TO ANALYZE OBJECTS OF INTEREST.

BACKGROUND

Prior to performing stereo-photogrammetry measurements according to conventional techniques, the fixed position of respective cameras relative to each other and the distortions of the individual lenses must be determined through a tedious calibration process. This operation is performed to obtain the radial distortion coefficient and the extrinsic parameters for the stereo-vision system. A calibration for field of views up to ~2 meter is performed by taking several pictures of calibration objects (such as panels or crosses) containing optical targets whose positions are previously well-known.

This procedure creates calibrated measuring volumes that are approximately the same width as the calibration object. As the dimensions of the targeted object increase, a more complex procedure needs to be performed (i.e., large-area calibration). This operation is typically arduous as it involves the use of coded and un-coded targets that have to be placed on an area having dimensions comparable to that of the object to be tested. Moreover, calibration itself is time-consuming because the fixed distance between several pair of targets or structural features needs to be measured to be used as a scale bar, and because each camera must be independently calibrated before acquiring a last picture with the two cameras placed in their final position for calculating the relative geometry of the stereo-vision system.

BRIEF DESCRIPTION OF EMBODIMENTS

In contrast to a conventional system requiring fixedly mounted and carefully calibrated image sensor devices, the sensor calibration system as discussed herein has the potential to make the currently used (conventional) photogrammetry calibration processes obsolete. The proposed system can be used as a cost effective structural evaluation tool providing quantitative two or three-dimensional measurements beyond what a single camera can provide.

More specifically, one embodiment of the image capturing system as discussed herein includes a set of image sensor devices such as a first image sensor device and a second image sensor device. One or both of the first image sensor device and the second image sensor device of the image capturing system as discussed herein are mobile (e.g., able to move freely in open space) in contrast to conventional techniques that require a pair of image capturing devices to be disposed at a fixed position and fixed orientation with respect to each other.

During operation of capturing images, the first image sensor device of the image capturing system as discussed herein is operable to produce first orientation information indicating an orientation of the first image sensor device at a time of capturing a first image of an object. The second image sensor device is operable to produce second orientation information indicating an orientation of the second image sensor device at a time of capturing a second image of the object. In one embodiment, the first image sensor device (a.k.a., first image capturing sensor) and the second image sensor device (a.k.a., second image capturing sensor) are synchronized to capture the first image and the second image at essentially or substantially the same time, or within a timeframe or window of time.

Note further that the system as described herein can include any number of image sensor devices such as a first image sensor device, second image sensor device, third image sensor device, fourth image sensor device, etc.

As further discussed herein, note that the image sensor devices can be located in any suitable apparatus. For example, each of the image sensor devices can be installed in an image sensor carrier device such as an unmanned aerial vehicle (such as a flying drone, self or remotely controlled by a human user), a cell phone of a respective user (such as fixed or movable in free space), etc.

In addition to each of the image sensor devices including one or more sensors to monitor respective orientation (in each of 3 dimensions), the image capturing system as discussed herein further includes measurement hardware and/or software to measure (calculate) and track a distance between the first image sensor device and the second image sensor device at each respective time of the image sensor devices capturing respective images. In one embodiment, a combination of the angular orientation information (such as pitch, roll, and yaw of each respective image sensor device) and the distance between image sensor devices provides sufficient geometric information to perform a photogrammetry analysis of the images by using a pair of sensors or multiple image sensor devices.

According to one configuration, a combination of the first orientation information, the second orientation information, and distance information indicating the distance between the first image sensor device and the second image sensor device is used to derive a three-dimensional (3-D) stereo view (or video) of the object of interest using the synchronously (or simultaneously) captured images.

In accordance with further embodiments, the first image sensor device is disposed at a fixed location with respect to the object of interest; the second image sensor device is either fixed on a tripod or other suitable resource, or it can be an airborne, mobile, or free-roaming device in motion with respect to the object and the first image sensor device. Alternatively, as described herein, any of the one or more image sensor devices can be airborne, mobile, free-roaming, etc., with respect to the object and the first image sensor device. Note that the object of interest (captured by respective images) also may be mobile.

In accordance with yet further embodiments, both the first image sensor device and the second image sensor device are airborne (mobile, free roaming, etc.) devices controlled to move on open space to synchronously capture images of the object from different perspectives.

In accordance with yet further embodiments, the first orientation information (derived by the first image sensor device for a first corresponding image) indicates roll, pitch, and yaw (orientation with respect to X, Y, Z coordinates) settings of the first image sensor device at the time of capturing the first image of the object; the second orientation information (derived by the second image sensor device for a corresponding second image) indicates roll, pitch, and yaw settings (angular orientation with respect to X, Y, Z coordinates) of the second image sensor at a time of capturing the second image.

The image capturing system as discussed herein further includes measurement hardware to measure and track a distance between the first image sensor device and the second image sensor device. In one embodiment, the measurement hardware is operable to measure and keep track of the distance of separation between the first image sensor device and the second image sensor device based on timing of wireless communications (such as based on Radio Frequency, laser, radar, optical, or acoustical signals, etc.) between the first image sensor device and the second image sensor device. However, note that any suitable method can be used to track and monitor the distance of separation between the first image sensor device and the second image sensor device.

Note further, as previously discussed, that the image capturing system can include any number of image sensor devices to monitor a respective object of interest.

Further embodiments herein include controller hardware operable to precisely or roughly control i) the orientation and position of the first image sensor device and ii) the orientation and position of the second image sensor device to capture multiple images of the object. Controlling orientation, location, etc., of each image sensor device ensures collection of useful images that can be used to perform structural analysis of the object of interest.

In another embodiment, two or more mobile communication devices (such as a two or more cellular smart phones with integrated cameras) can be used to acquire images. For example, each mobile communication device (a.k.a., image sensor device) can be configured to determine orientation (roll, pitch, and yaw) during capturing of a respective image in a manner as previously discussed; one or more of the mobile communication devices determines the relative distance between the mobile communication devices. Such a distance measurement can be determined in a similar manner such as via a displacement sensor, tape measure, acoustic range finder, wireless signaling, optical signaling, etc.

In one embodiment, to determine distance between one or more of the mobile communication devices, one mobile communication device sends an audible pulse to the other mobile communication device; one or more mobile communication devices measures time between audio transmission from one mobile communication device and reception by the other device. The mobile communication devices can be configured to communicate any captured timing to the other mobile communication device. The embedded phone sensor information between each phone can provide the necessary information to perform the stereo photogrammetry on the structure of interest.

In one embodiment, when each of one or more image sensor devices is a handheld device, a respective user controls orientation of the corresponding camera to capture images. If desired, a mobile communication device is designated as a master mobile communication device that communicates with a slave mobile communication device to synchronize a moment of each mobile communication device capturing an image of the same object of interest.

In another embodiment, note that each of two or more image sensor devices can be configured to track its relative position with respect to a fixed or ground sensor station to determine its location in free space. Accordingly, the location of each mobile communication device (image sensor device) may be known relative to a same location. Such information can be analyzed to obtain distance information indicating a distance between the mobile communication devices at a time of capturing a respective image pair (or set).

In one embodiment, the controller hardware is operable to: i) control the orientation and position of the first image sensor device to point the first image sensor device in a first axial direction toward the object to capture the first image, and ii) control the orientation and position of the second image sensor device to point the second image sensor device in a second axial direction toward the object to capture the second image. If desired, the controller hardware can be further operable to control the first image sensor device and the second image sensor device such that an angle between the first axial direction and the second axial direction falls within a desired angular range.

Further embodiments herein include data management hardware (which can be localized or distributed). The data management hardware is operable to map/track related information such as the distance between the first image sensor device and the second image sensor device, as well as corresponding orientations of the first image sensor device and the second image sensor device to analyze the object of interest. As previously discussed, the combination of the collected orientation information and the distance between image sensor devices is used to perform a photogrammetry analysis of the object.

These and further embodiments are discussed below.

Note that any of the resources as discussed herein can include one or more computerized devices, mobile communication devices, image analyzers, image capturing sensors, image sensor carrier devices, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to support wireless communications, image processing, image capturing, etc., according to embodiments herein. The instructions, when executed by the computer processor hardware, cause the computer processor hardware (such as one or more co-located or disparately processor devices or hardware) to: receive first orientation information indicating an orientation of a first image sensor device at a time of capturing a first image of an object; receive second orientation information indicating an orientation of a second image sensor device at a time of capturing a second image of the object; receive a distance of separation between the first image sensor device and the second image sensor device at times of capturing the first image and the second image; and utilize the first orientation information, the second orientation information, and the distance information to derive a 3-D stereo view of the object using the first image and the second image.

Another embodiments herein includes a computer readable storage medium and/or system having instructions stored thereon to provide image capturing, processing, etc., according to embodiments herein. The instructions, when executed by the computer processor hardware, cause the computer processor hardware (such as one or more co-located or disparately processor devices or hardware) to: produce first orientation information indicating an orientation of a first image sensor device at a time of capturing a first image of an object; produce second orientation information indicating an orientation of a second image sensor device at a time of capturing a second image of the object; measure a distance of separation between the first image sensor device and the second image sensor device at times of capturing the first image and the second image; and utilize the first orientation information, the second orientation information, and the distance information to derive a 3-D stereo view of the object using the first image and the second image.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of conveying wireless communications in wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposely does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
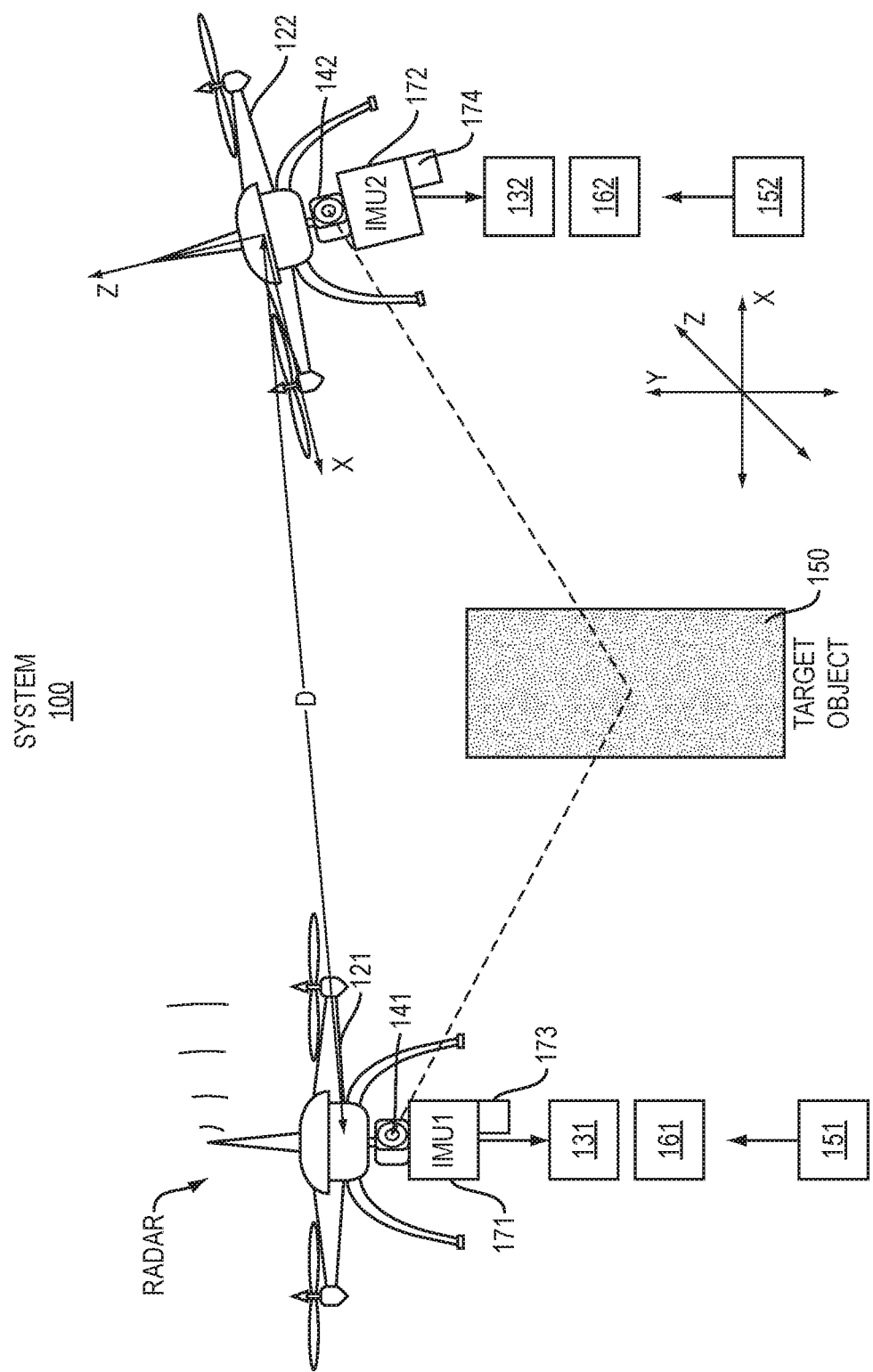
FIG. 1 is an example side view diagram of implementing image sensor devices to monitor an object according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

FIG. 1 is an example side view diagram of implementing image sensor devices to monitor an object according to embodiments herein.

More specifically, as shown, one embodiment of the image capturing system 100 as discussed herein includes a first image sensor carrier device 121 and a second image sensor carrier device 122.

Note that the first image sensor carrier device 121 and the second image sensor carrier device 122 can be any device type suitable to carry one or more image sensors. For example, in one embodiment, each image sensor carrier device can be a drone (flying vehicle), automobile (road driving vehicle), a user operated mobile communication device (such as a cellular phone, personal device, handheld computer, etc.), and so on.

In contrast to conventional techniques that require a pair of image capturing devices to be disposed at a fixed position with respect to each other, one or both of the first image sensor carrier device 121 and the second image sensor carrier device 122 are able to move freely in open space with respect to each other and/or the object 150. In accordance with further embodiments, one or both of the image sensor carrier devices can be set to fixed positions. As further described herein, on-board orientation and position sensor can be used to collect calibration information as images are collected.

The first image sensor carrier device 121 of the image capturing system 100 as discussed herein is operable to produce first orientation information 131 indicating an orientation of the first image sensor carrier device 121 (and corresponding image sensor 141) at a time of capturing a first image 161 of object 150. The second image sensor carrier device 122 is operable to produce second orientation information 132 indicating an orientation of the second image sensor carrier device 122 (and corresponding image sensor 142) at a time of capturing a second image 162 of the object 150.

If desired, the first image capturing sensor 141 and the second image capturing sensor 142 can be synchronized to capture the first image 161 and the second image 162 at substantially the same time, within a predetermined window of time, around, or approximately the same time.

Each of the image sensor carrier devices 121 and 122 includes sensors to monitor an orientation of the respective image sensor device.

For example, image sensor carrier device 121 includes orientation sensors 171 to monitor an orientation of the image sensor carrier device 121 in three-dimensional space (with respect to fixed X, Y, and Z axis). Image sensor carrier device 122 includes orientation sensors 172 to monitor an orientation of the image sensor carrier device 122 in three-dimensional space (with respect to a fixed X, Y, and Z axis).

In addition to each of the image sensor carrier devices including sensors to monitor orientation, the image capturing system 100 includes measurement hardware to measure and track a distance, D, between the first image sensor carrier device 121 and the second image sensor carrier device 122 at times of the image sensor carrier devices 121 and 122 capturing images 161 and 162.

According to one configuration, a combination of the first orientation information 131, the second orientation information 132, and distance information (D) indicating the distance between the first image sensor carrier device 121 and the second image sensor carrier device 122 is used to derive a 3-D stereo view (or 3-D video) of the object 150 using one or more synchronously captured images.

In one embodiment, the first image sensor carrier device 121 is disposed at a fixed location with respect to the object 150 of interest; the second image sensor carrier device 122 is an airborne device in motion (and freely movable) with respect to the object 150 and the first image sensor carrier device 121.

In accordance with yet further embodiments, both the first image sensor carrier device 121 and the second image sensor carrier device 122 are airborne (freely movable) devices controlled to move in open space to synchronously capture images of the object 150 from one or more different perspectives.

In one embodiment, the first image sensor carrier device 121 is disposed at a first fixed location with respect to the object 150 of interest; the second image sensor carrier device 122 is disposed at a second fixed location with respect to the object 150 and the first image sensor carrier device 121.

In accordance with further embodiments, the first orientation information 131 (derived by the orientation sensors 171 of the first image sensor carrier device 121) indicates roll, pitch, and yaw (XYZ) orientation settings of the first image sensor carrier device 121 and corresponding image sensor 141 at the time of capturing the first image 161 of the object 150; the second orientation information 132 (derived by the orientation sensors 172 of the second image sensor carrier device 122) indicates roll, pitch, and yaw (XYZ) orientation settings of the second image sensor carrier device 122 and corresponding image sensor 142 at a time of capturing the second image 162.

As previously discussed, the image capturing system 100 can be configured to include measurement hardware to measure and track a distance, D, between the first image sensor carrier device 121 and the second image sensor carrier device 121. Further embodiments herein include measuring and storing a distance, D, for each pair of simultaneously captured images generated by the pair of image sensor carrier devices 121 and 122. Thus, for each simultaneous captured sampled pair of images (samples taken at different times), the system 100 stores corresponding distance as well as corresponding orientation information of each image sensor carrier device.

Note that measurement hardware to determine the value D for each set of captured images can reside on the one or more image sensor carrier devices or be disposed external to the image sensor carrier devices.

Further, as previously discussed, the distance, D, between the first image sensor carrier device 121 and the second image sensor carrier device 122 varies over time because the sensor devices 121 and 122 are free to move. Different portions of the measurement hardware to measure distance, D, can be mounted to the image sensing device 121 and image sensing device 122.

In one embodiment, the distance measurement hardware is operable to measure and keep track of the distance of separation (D) between the first image sensor carrier device 121 and the second image sensor carrier device 122 based on: i) timing of wireless communications transmitted between the first image sensor carrier device 121 and the second image sensor carrier device 122, ii) timing of wireless communications transmitted from the first image sensor carrier device 121 to the second image sensor carrier device 122, iii) round-trip time of communications between the image sensor carrier devices, etc. In one embodiment, both the first image sensor carrier device and the second image sensor carrier device operate off a same clock or synchronized set of clocks to capture respective images at substantially the same time (such as within 1 second, within 1 millisecond, within 1 microsecond, etc.).

Note again that, as an alternative to measuring distance of separation between image sensor carrier devices via timing (such as based on time of a signal traveling from one device to another, round-trip time, etc.) of wireless communications (such as audio signals, electromagnetic signals, etc.) communicated between the image sensor carrier devices, any suitable method can be used to track and monitor the distance of separation, D, between the first image sensor carrier device 121 and the second image sensor carrier device 122.

One or both of the image sensor carrier devices 121, 122 produces and stores the distance information, D, indicating a respective separation of distance between the first image sensor carrier device 121 and the second image sensor carrier device 122.

Note that further embodiments herein can include controller hardware 151 and 152 such as one or more remote control devices (human controlled, artificial intelligence controlled, etc.) operable to control i) the orientation and position of the first image sensor carrier device 121 and ii) the orientation and position of the second image sensor carrier device 122 to capture multiple images of the object from one or more different perspectives. Controlling a general or precise orientation, location, etc., of each image sensor carrier devices 121 and 122 ensures collection of useful images (e.g., each image sensor carrier device capturing a respective image of the same object or location of interest) that can be used to perform structural analysis of the object or location of interest.

In one embodiment, the remote control device 151 wirelessly communicates with image sensor carrier device 121 and corresponding image capturing sensor 141 to control its orientation and position relative to the object 150 and the image sensor carrier device 122; the remote control device 152 wirelessly communicates with image sensor carrier device 122 and corresponding image capturing sensor 142 to control its orientation and position relative to the object 150 and the image sensor carrier device 121.

Figure 2:
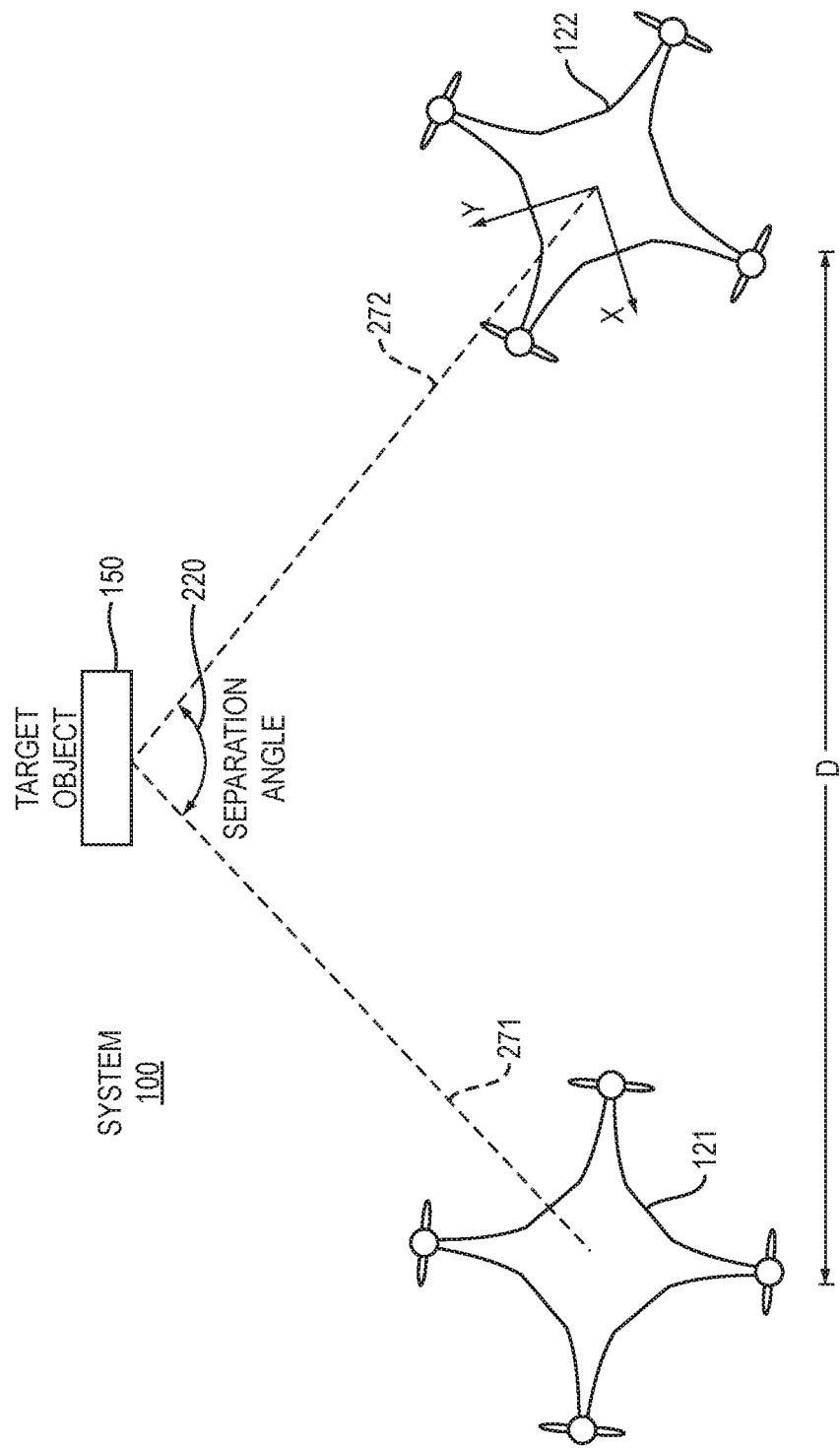
FIG. 2 is an example top view diagram of implementing image sensor devices to monitor an object according to embodiments herein.

FIG. 2 is an example top view diagram of implementing image sensor carrier devices to monitor an object according to embodiments herein.

In one embodiment, the controller hardware associated with image capturing system 100 is operable to: i) control the orientation and position of the first image sensor carrier device 121 to point the first image sensor 141 (such as a multi-pixel camera obtaining 2-D images, [LIDAR] Light Detection And Ranging device capturing surface relief of the monitored object from a given angle/orientation, etc.) in a first axial direction 271 toward the object 150 to capture the first image 161, and ii) control the orientation and position of the second image sensor carrier device 122 (such as a multi-pixel camera obtaining 2-D images, LIDAR device capturing surface relief of the monitored object from a given angle/orientation, etc.) to point the second image sensor 142 in a second axial direction 272 toward the object 150 to capture the second image 162.

Note again that the image capturing system 100 is not necessarily required to precisely control the orientation and positioning of the image sensor carrier devices 121 and 122 because the collected orientation information and distance information captured for each set of images provides on-the-fly calibration information to process the images.

If desired, the controller hardware can be further operable to control orientations and/or positions of the first image sensor carrier device 121 and the second image sensor carrier device 122 such that an angle of separation 220 between the first axial direction 271 (such as center axial view of image capturing sensor 141) and the second axial direction 272 (such as center axial view of image capturing sensor 142) falls within a desired angular range such as between 5 and 45 degrees, or any other suitable range of angles supporting analysis of the object. Collection of sets of images while the image sensor carrier devices 121 and 122 are at different locations and angles with respect to the object 150 supports a better 3-D analysis of the object 150.

Figure 3:
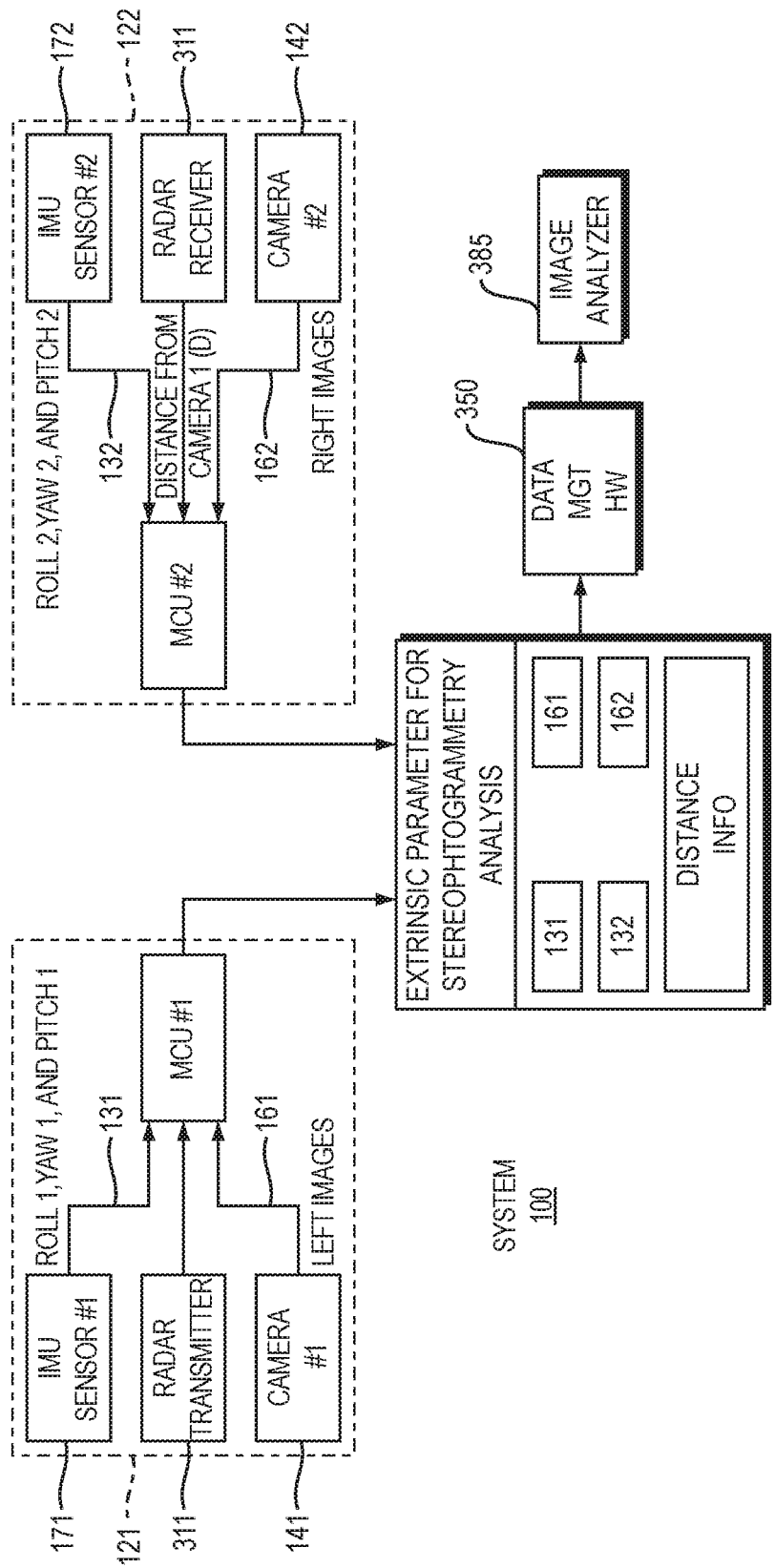
FIG. 3 is an example diagram illustrating attributes of an image capturing system and related functionality according to embodiments herein.

FIG. 3 is an example diagram illustrating of an image capturing system and related functionality according to embodiments herein.

Further embodiments herein include data management hardware 350 (which can be localized or distributed with respect to the image sensor carrier devices 121 and 122).

In this example embodiment, the data management hardware 350 is operable to receive, store, manage, etc., information such as orientation information 131 and image information 161 generated by the image-sensing device 121. The data management hardware 350 is further operable to receive, store, manage, etc., information such as orientation information 132 and image information 162 generated by the image-sensing device 122.

The data management hardware 350 is further operable to keep track of related information such as the distance (D) between the first image sensor carrier device 121 and the second image sensor carrier device 122 for each set of synchronously obtained images, as well as corresponding orientations of the first image sensor carrier device 121 and the second image sensor carrier device 122 at times of capturing images to analyze the object 150 of interest via any suitable stereo image analysis technique.

The orientation information 131 and 132 as well as distance information, D, produced by the image sensor carrier devices enables computer processor hardware to perform a 3-D analysis of the object 150 using appropriate geometry.

Accordingly, embodiments herein include a novel wireless calibration system that will enable three-dimensional (3-D) Digital Image Correlation (DIC) and photogrammetry to be performed on virtually any large-scale structure using a couple of remotely paired cameras. The system can be applied to fixed, semi-fixed, or moving cameras such as those mounted to moving vehicles (e.g. unmanned aerial vehicles (UAVs). Traditionally, prior to perform stereo-photogrammetry measurements, the relative position of the two cameras and the distortions of the individual lenses must be determined through a calibration process. To facilitate camera calibration, a wireless sensor package determines the relative position and orientation of the optical sensors (in the image sensor carrier devices) with respect to each other in real time. Via such information, the image system as described herein determines the stereo-vision system intrinsic and extrinsic parameters (e.g. base distance and separation angle) in order to streamline both calibration and allow for making robust measurements from both small to very-large scales.

Additionally, embodiments herein rely on a sensor-board unit installed on each of the cameras to determine the seven degrees-of-freedom (DOFs) needed to identify their relative position. The DOFs include: the distance between the cameras together with roll, pitch, and yaw angles of each image capturing sensor 141 and image capturing sensor 142 respectively in a setup similar to that shown in FIG. 1.

In one embodiment, the sensor-board includes a MEMS-based Inertial Measurement Unit (IMU) and a radar unit. The IMU accelerometer and gyroscope (i.e. roll and pitch measurement) along with the compass (e.g. for yaw detection) determines the separation angle 220 between the image capturing sensors 141 and 142 in space and for compensating undesired motions, while the radar (or other suitable mechanism) measures distance, D, between the image capturing sensors 141 and 142 of the image sensor carrier devices 121 and 122.

As previously discussed, each time a picture (image) is taken of the object of interest 150, IMU-radar data generated by radar receiver 311 (or other suitable resource) is recorded. Such data is used to determine the extrinsic parameters (such as distance between the image sensor carrier devices) of the stereo-vision system. In one embodiment, the knowledge of these data will allow triangulating the recorded images, calibrating each picture taken independently, and performing quick 3-D-DIC measurements over very large areas without having to rely on a large calibration panel or surface. In accordance with further embodiments, the calibration system as described herein is insensitive to camera movement and therefore can be attached to moving vehicles, such as a pair of unmanned aerial vehicles (UAVs) or image sensor carrier devices 121 and 122, to enable measurement from multiple locations and fields of view (FOV).

Embodiments herein make it possible to perform photogrammetry and 3-D-DIC analyses without any preliminary calibration and limitations regarding the cameras' maximum base distance. The calibration system sensing platform can leverage the optically based methods to perform structural health inspection and monitoring of very large-sized structures.

Note that embodiments herein are useful in a number of applications. For example, the image capturing system as discussed herein makes it possible to perform 3-D-DIC full-scale analyses of large-scale structures for characterizing their mechanical properties (e.g. displacement, strain), geometrical profiles, and deformations. Such a system 100 improves the quality of structural evaluation by providing more cost-effective, cheaper, and less time-consuming inspections by reducing assessment costs and downtime. All the engineering fields requiring assessment of structural properties can beneficiate from the development of this invention. Moreover, the field of applicability of traditionally employed optically-based systems will be expanded as the novel calibration system as described herein overcomes limitations of the traditional 3-D-DIC measurements (e.g. hard-mounted connection between cameras). By way of non-limiting example embodiments, the system as described herein enables for example, when the image capturing sensors 141 are implemented on drones, application of the novel approach as described herein include the inspection of difficult to access locations that need periodical assessment such as:

Bridges (e.g. expansion joints, cracks, deck soffit, cables, girders, column, etc.);
Concrete dams and nuclear power plants;
Railroad tracks components (e.g. crossties, rails);
Aircraft components (e.g. wings, fuselage);
Utility-scale wind turbines and blades;
Aerial surveying and measurements;
Landslide risk assessment and management.

Figure 4:
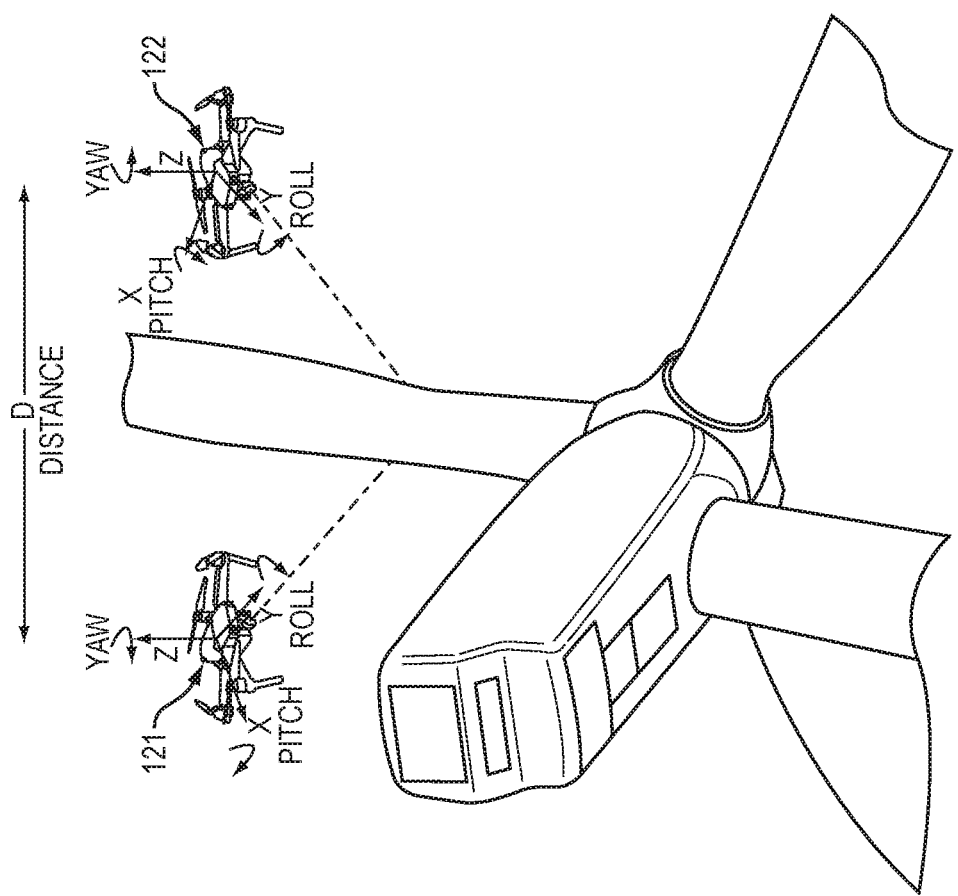
FIG. 4 is an example diagram illustrating use of an image capturing system to analyze a wind turbine according to embodiments herein.
Figure 5:
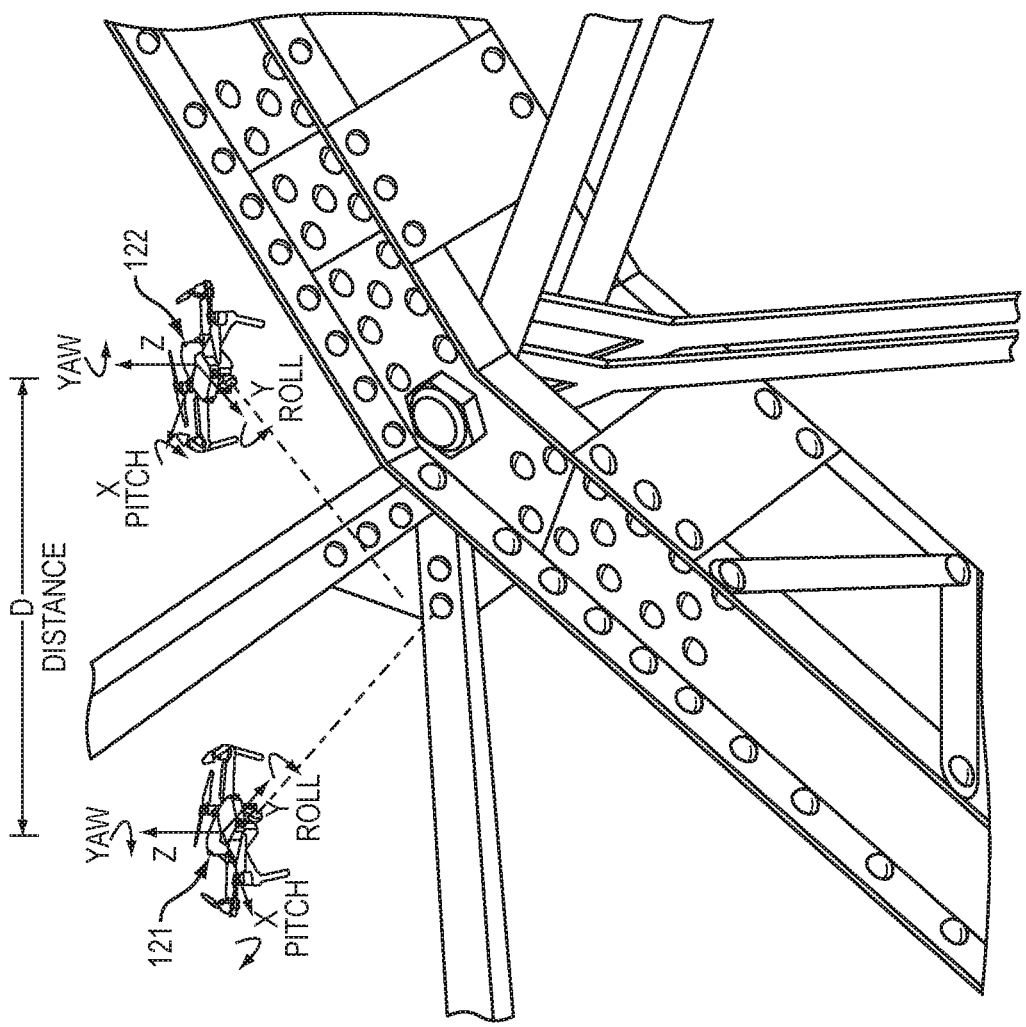
FIG. 5 is an example diagram illustrating use of an image capturing system to analyze a bridge structure according to embodiments herein.

Further examples of implementing applications and the operational principles of the proposed image capturing system 100 (such as 3-D-DIC-UAV as discussed herein) include monitoring (at different times) structural changes associated with structures such as wind turbine blades (in a manner as shown in FIG. 4) and bridges (in a manner as shown in FIG. 5).

Figure 6:
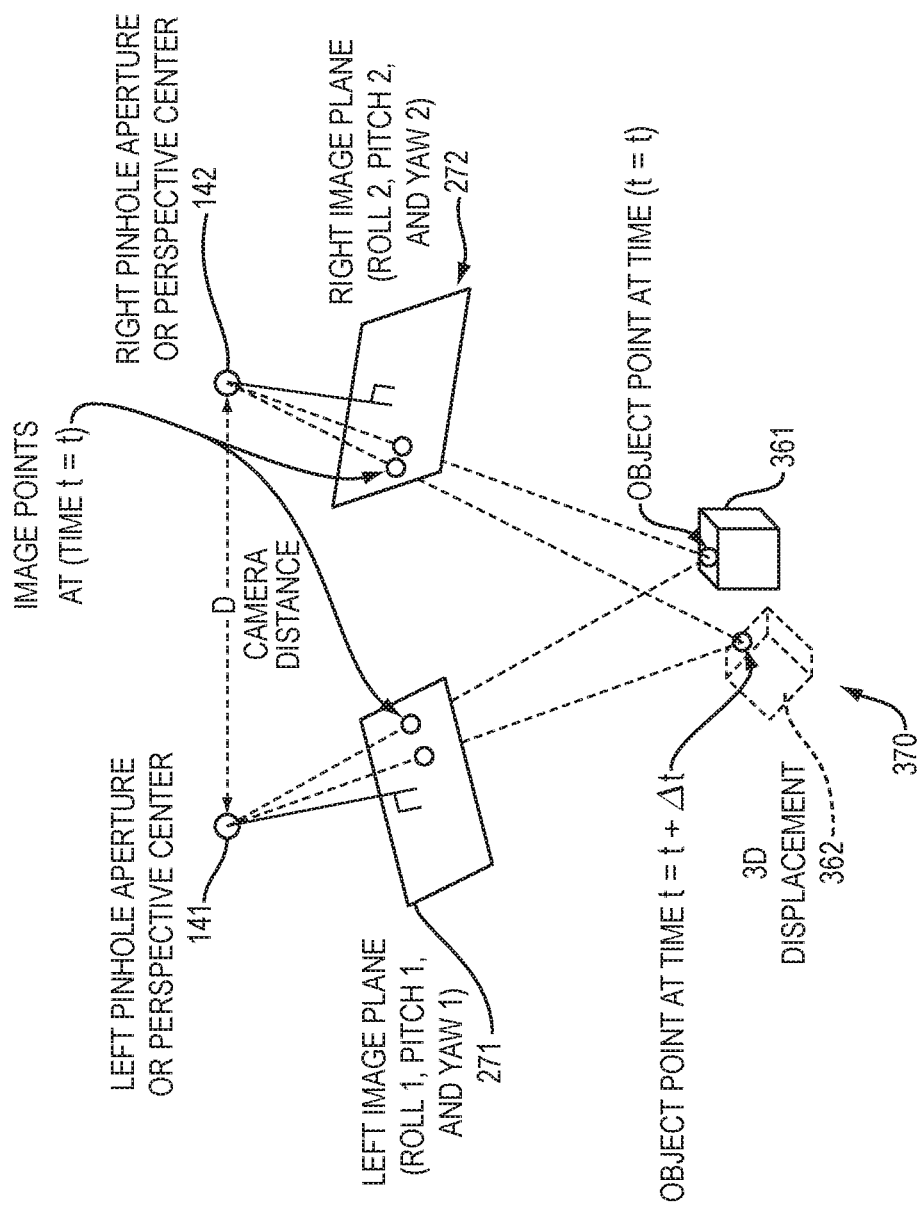
FIG. 6 is an example of stereophotogrammetry and triangulation of an optical target's 3-D displacement on the surface of an object according to embodiments herein.

FIG. 6 is an example of stereophotogrammetry and triangulation of an optical target's 3-D displacement on the surface of an object.

In this example embodiment, the image capturing sensor 141 and image capturing sensor 142 reside at a relative distance (D) apart from each other for each set of synchronously obtained images. The (IMU) orientation sensor 171 is operable to measure the roll, pitch, and yaw angles (orientation information 131) of image capturing sensor 141 (camera #1 and left image plane 271) while (IMU) orientation sensor 172 is used for measuring the roll, pitch, and yaw angles (orientation information 132) of image capturing sensor 142 (camera #2, and right image plane 272). By knowing this set of data, it is possible to triangulate the position of the object 361 with respect to image capturing sensors 141 and 142.

The data management hardware 350 in this example embodiment is further operable to keep track of related information such as the distance (D) between the first image sensor carrier device 121 and the second image sensor carrier device 122 for each set of synchronously obtained images, as well as corresponding orientations of the first image sensor carrier device 121 and the second image sensor carrier device 122 at times of the image capturing sensors 141 and 142 capturing images to analyze the object of interest 361 (or object 150) via any suitable stereo image analysis technique. As object 361 moves over time (as indicated by location 362), the three dimensional (3-D) digital image correlation (DIC) system (such as image analyzer 385 as previously discussed) tracks movement of the object 361 and computes the 3-D displacement (370).

In one embodiment, an algorithm (such as implemented by the image analyzer 385) uses the spatial information of the cameras (i.e., D, 131, 132, 161, and 162) recorded by the image sensor carrier devices 121 and 122 to triangulate the mutual position of the two cameras with respect to the optical targets recorded in each picture to track their 3-D displacement (370) at different times or stages (361 and 362) is then developed.

Figure 7:
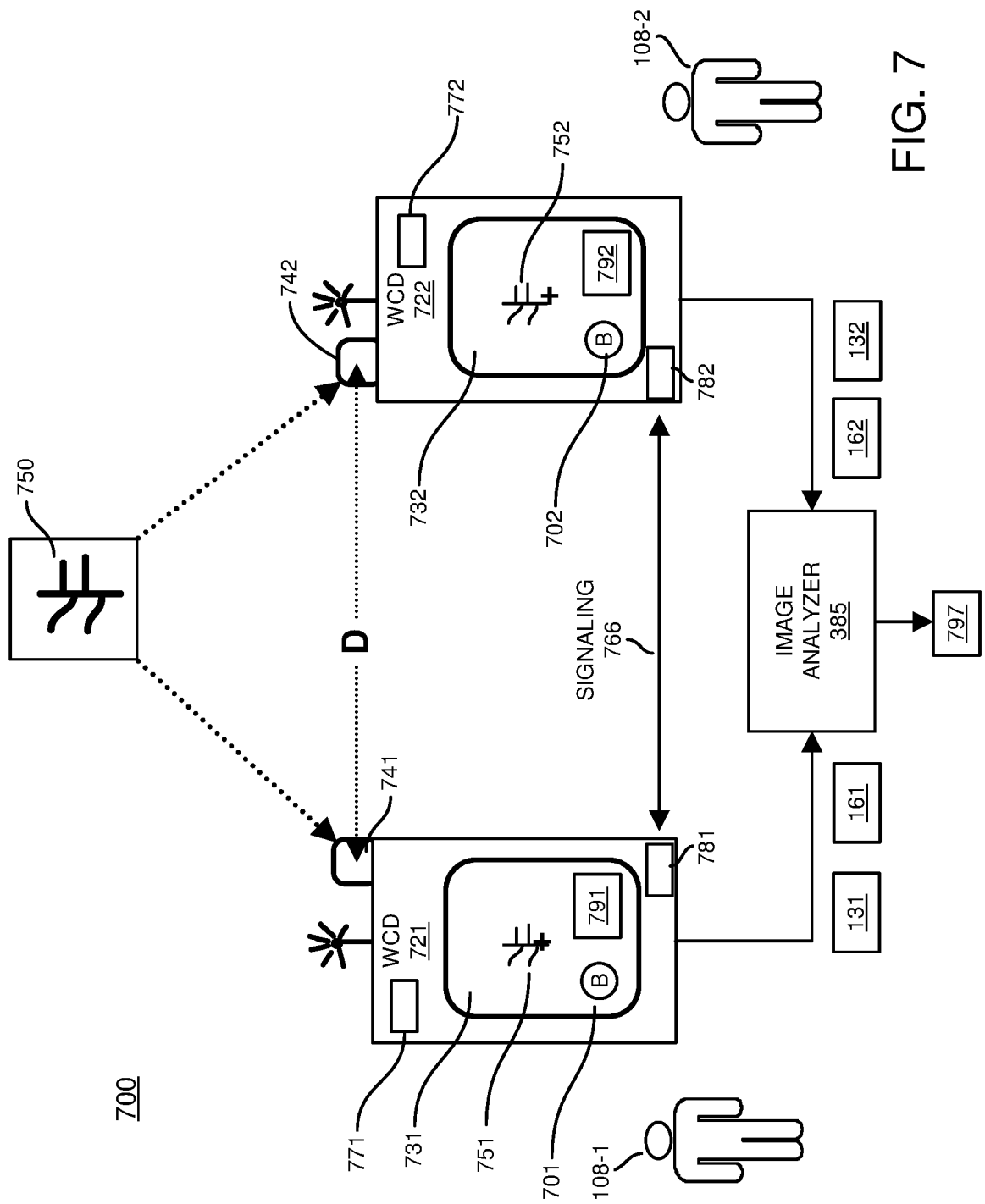
FIG. 7 is an example diagram illustrating a system of implementing an image capturing system according to embodiments herein.

FIG. 7 is an example diagram illustrating an image capturing system according to embodiments herein.

In this example embodiment, the network environment 700 includes object 750, wireless communication by 721 (a.k.a., a mobile communication device, personal device, etc.), wireless communication device 722 (a.k.a., a mobile communication device, personal device, etc.), and image analyzer 385.

As further shown, the wireless communication device 721 includes a display screen 731 and corresponding orientation sensors 771. As its name suggests, the orientation sensors 771 detect the orientation (with respect to x, y, z axis) of the wireless communication device 721 and the corresponding image capturing sensor 741. The wireless communication device 722 includes a display screen 732 and corresponding orientation sensors 772. The orientation sensors 772 detect the orientation (with respect to x, y, z axis) of the wireless communication device 722 and the corresponding image capturing sensor 742.

During operation, user 108-1 controls movement and operation of wireless communication device 721 and corresponding image capturing sensor 741 to capture images 161 associated with the object 750. For example, display screen 731 of the wireless communication device 721 displays images captured by the wireless communication device 721. Based on capturing an image associated with object 150, the wireless communication by 721 displays the rendition 751 of the corresponding object 750 on display screen 731. As further shown, the display screen 731 can be configured to include a symbol (+ symbol in center of the display screen 731) indicating the approximate desired location in which the rendition 751 of the object of interest 750 should appear on the display screen 731 for capturing respective images.

Further, during operation, user 108-2 controls movement and operation of wireless communication device 722 and corresponding image capturing sensor 742 to capture images 162 associated with the object 750. For example, display screen 732 of the wireless communication device 722 displays images captured by the wireless communication device 722. Based on capturing an image associated with object 150, the wireless communication device 722 displays the rendition 752 of the corresponding object 750 on display screen 732. As further shown, the display screen 732 can be configured to include a symbol (+ symbol in center of the display screen 732) indicating the approximate desired location in which the rendition 752 of the object of interest 750 should appear on the display screen 732 for capturing respective images.

Accordingly, the first image sensor device (such as wireless communication device 721) includes a first display screen 731; the first display screen is operable to display a rendition 751 of the object 750 to a first user 108-1 operating the first image sensor device. The second image sensor device (such as wireless communication device 722 includes a second display screen 732; the second display screen operable to display a rendition 752 of the object 750 to a second user 108-2 operating the second image sensor device.

Note that each of the wireless communication devices 721 and 722 includes a respective ranging resource 781 and 782 to detect the distance D between corresponding image capturing sensor 741 and image capturing sensor 742. In a similar manner as previously discussed, the ranging resources 771 and 772 can be configured to implement any suitable technique to determine, such as via signaling 766, distance D between the image capturing sensor 741 and the image capturing sensor 742.

In accordance with yet further embodiments, the wireless communication device 721 includes a control button 701 (such as the display screen 731), selection of which is operable to generate a command, the command initiates simultaneous activation of the first image sensor device (and corresponding image capturing sensor 741) to capture a first image (such as rendition 751 of the object 750 displayed on display screen 731) at a substantially same time as the second wireless communication device 722 and corresponding image capturing sensor 742 capturing the second image such as rendition 752 of the object 750 on display screen 732.

In one embodiment, selection of the button 701 results in the first image sensor device (such as wireless communication device 721) communicating a wireless communication (signal, command, etc.) to the second image sensor device (such as wireless communication device 722) to capture the second image in response to selection of the button. If desired, the wireless communication device 721 and the wireless communication device 722 operate off synchronized clocks to further facilitate capturing of respective images at the same time.

At a time of capturing (in response to user 108-1 selecting button 701 on wireless communication device 771 or user 108-2 selecting button 702 on wireless communication device 772) the rendition 751 and rendition 752 as image 161 and image 162: i) the ranging resources 781 and 782 determine a distance D between the image capturing sensor 741 and the image capturing sensor 742; and ii) the orientation sensors 771 capture and record an orientation (via orientation information 131) of the image capturing sensor 741, and iii) the orientation sensors 772 capture and record an orientation (via orientation information 132) of the image capturing sensor 742.

Wireless communication device 721 forwards each sampled image 161, distance D and corresponding orientation information 131 to the image analyzer 385; wireless communication device 722 forwards each sampled image 162 and corresponding orientation information 132 to the image analyzer 385 as well.

In a similar manner as previously discussed, the image analyzer 385 produces stereo or 3-D image data 766 (such as a virtual rendition) of the object 750 (or corresponding location and surroundings using the received image information. In one embodiment, the virtual rendition of the object (or objects, location, etc.) can be used in conjunction with green screen technology in which a user is able to obtain further (either 2-D or 3-D) images of a person or thing which is then superimposed onto the virtual rendition of the location (virtual rendition) derived from the initially captured images 161 and 162.

Figure 8:
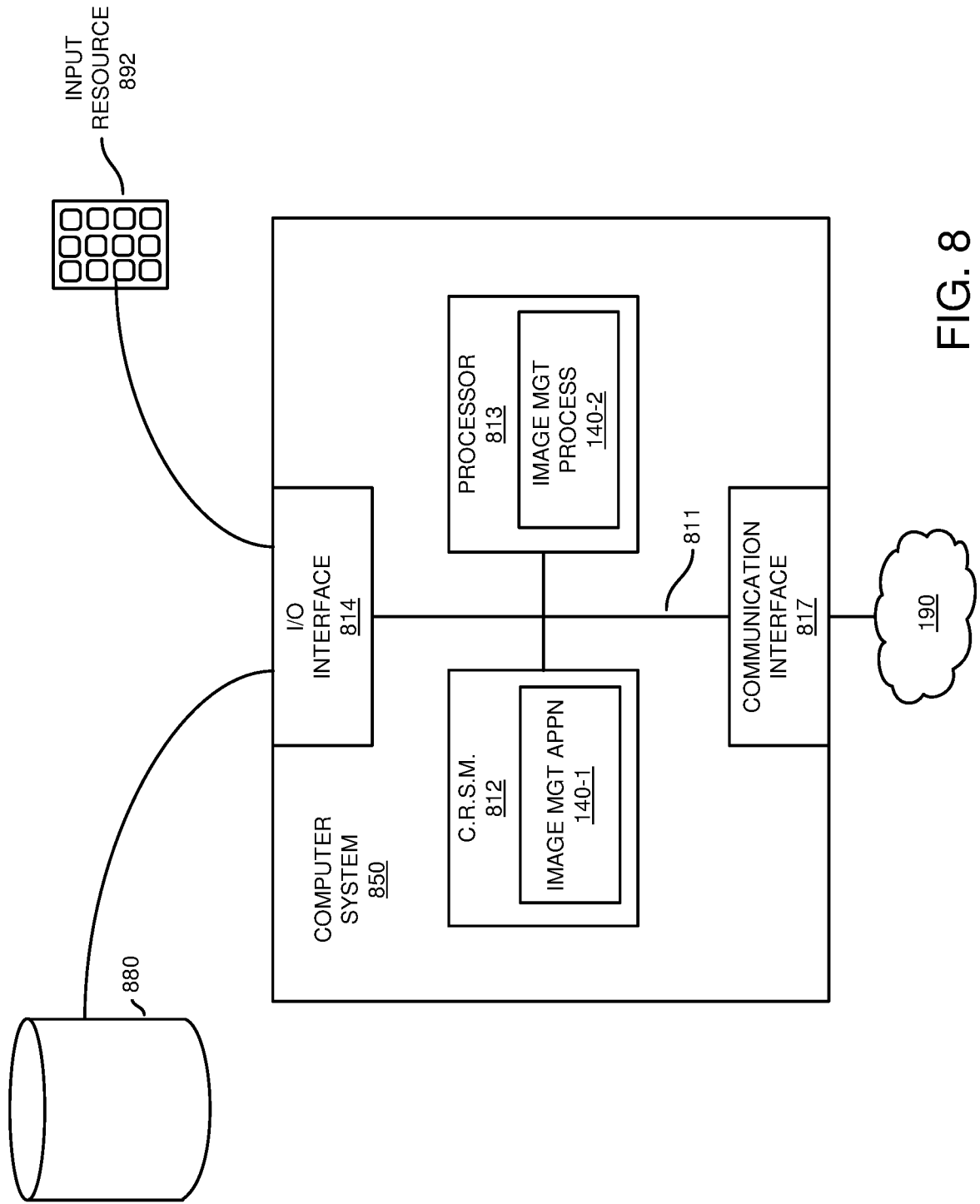
FIG. 8 is an example diagram of a computer architecture executing software instructions according to embodiments herein.

FIG. 8 is an example block diagram of a computer system for implementing any of the operations as previously discussed according to embodiments herein.

Any of the resources (such as orientation sensors 171 and 172, distance measurement resource 173 and 174, image analyzer 385, image capturing sensors, image sensor carrier devices, etc.) as discussed herein can be configured to include computer processor hardware and/or corresponding executable instructions to carry out the different operations as discussed herein.

As shown, computer system 850 of the present example includes an interconnect 811 coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with image management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in image management application 140-1 stored on computer readable storage medium 812. Execution of the image management application 140-1 produces image management process 140-2 to carry out any of the operations and/or processes as discussed herein.

Those skilled in the art will understand that the computer system 850 can include other processes and/or software and hardware components, such as an operating system that controls allocation and use of hardware resources to execute image management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
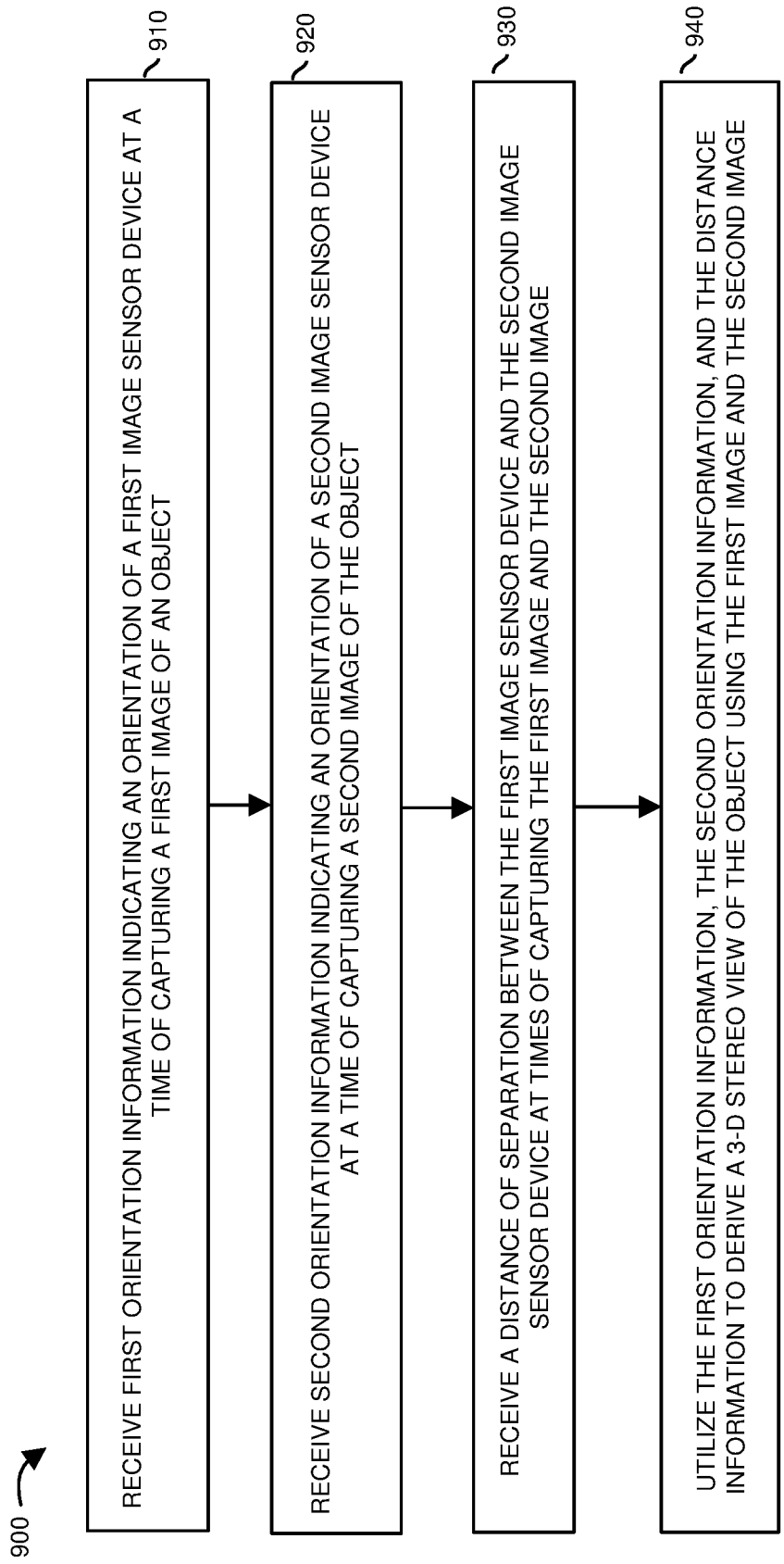
FIGS. 9 and 10 are diagrams of illustrating example methods according to embodiments herein.

FIG. 9 is a flowchart 900 illustrating an example method according to embodiments. Note that there will be some overlap with respect to concepts as discussed above.

In processing operation 910, the orientation sensors 171 of the image sensor carrier device 121 produce first orientation information 131 indicating an orientation of the image capturing sensor 141 at a time of capturing a first image 161 of an object 150.

In processing operation 920, the orientation sensors 172 of the image sensor carrier device 122 produce second orientation information 132 indicating an orientation of the image capturing sensor 142 at a time of capturing a second image 162 of the object 150.

In processing operation 930, the measurement hardware 173 and/or 174 measures a distance of separation between the first image sensor carrier device 121 and corresponding image capturing sensor 141 and second image sensor carrier device 122 and corresponding image capturing sensor 142.

In processing operation 940, the image analyzer 385 utilizes the first orientation information 131, the second orientation information 132, and the distance information (D) to derive a 3-D stereo view of the object 150 using the first sample images 131 and the second sample images 132.

Figure 10:
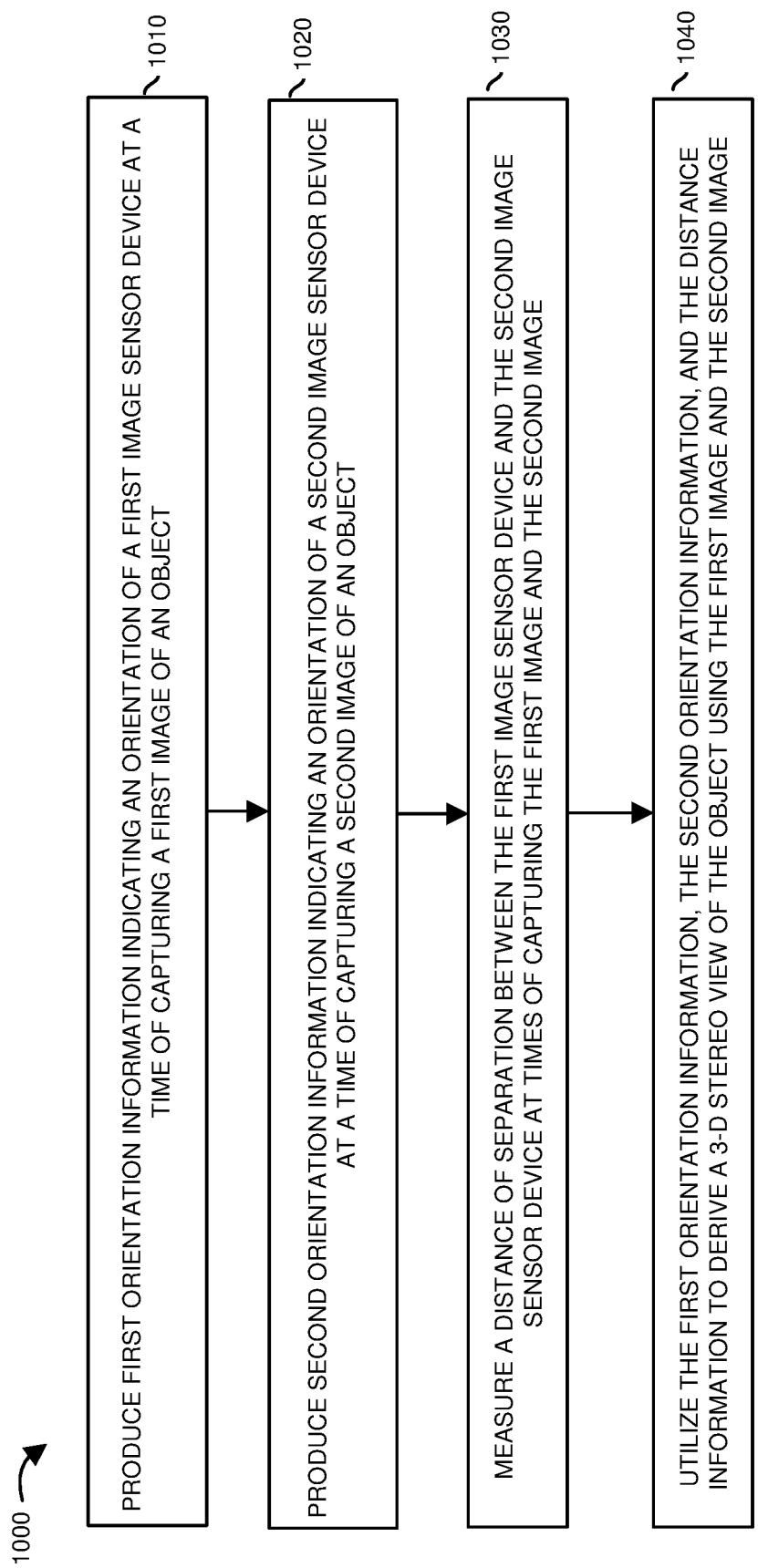

FIG. 10 is a flowchart 1000 illustrating an example method according to embodiments. Note that there will be some overlap with respect to concepts as discussed above.

In processing operation 1010, the image analyzer 385 of image capturing system 100 receives first orientation information 131 indicating an orientation of a first image capturing sensor 141 and corresponding image sensor carrier device 121 (such as a carrier) at a time of the image capturing sensor 141 capturing a first image 161 of the object of interest 150.

In processing operation 1020, the image analyzer 385 of image capturing system 100 receives second orientation information 132 indicating an orientation of a second image capturing sensor 142 and corresponding image sensor carrier device 122 (such as carrier) at a time of capturing a second image 162 of the object of interest 150. As previously discussed, the time of the image capturing sensor 142 capturing the second image 162 of the object of interest 150 is substantially the same as a time of the image capturing sensor 141 capturing the first image 161 of the object of interest 150.

In processing operation 1030, the image analyzer 385 of image capturing system 100 receives a distance of separation value (D) between the first image sensor carrier device and the second image sensor carrier device at a time of capturing the first image 161 and the second image 162.

In processing operation 1040, the image analyzer 385 of image capturing system 100 utilizes (for each sample the image capturing sensors 141 and 142 simultaneously capturing respective images) the first orientation information 131, the second orientation information 132, and the distance information (D) to derive a 3-D stereo view of the object (or location) of interest 150 using the first images (captured by the first image capturing sensor 141) and the second images (captured by the second image capturing sensor 142).

Note again that techniques as discussed herein are well suited for use in photogrammetry applications. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A system comprising:
   a first image sensor device, the first image sensor device operable to produce first orientation information indicating an orientation of the first image sensor device at a time of capturing a first image of an object;
   a second image sensor device, the second image sensor device operable to produce second orientation information indicating an orientation of the second image sensor device at a time of capturing a second image of the object; and
   measurement hardware operable to measure a distance between the first image sensor device and the second image sensor device at times of capturing the first image and the second image.

2. The system as in claim 1, wherein the first image sensor device and the second image sensor device are synchronized to capture the first image and the second image at substantially the same time.

3. The system as in claim 1, wherein the first orientation information indicates roll, pitch, and yaw settings of the first image sensor device at the time of capturing the first image; and
wherein the second orientation information indicates roll, pitch, and yaw settings of the second image sensor device at the time of capturing the second image.

4. The system as in claim 1, wherein the measurement hardware is operable to measure the distance of separation between the first image sensor device and the second image sensor device based on wireless communications between the first image sensor device and the second image sensor device.

5. The system as in claim 1 further comprising:
controller hardware operable to control i) the orientation and position of the first image sensor device and ii) the orientation and position of the second image sensor device to capture multiple images of the object including the first image and the second image.

6. The system as in claim 1 further comprising:
controller hardware operable to control: i) the orientation and position of the first image sensor device to point the first image sensor device in a first axial direction toward the object to capture the first image, and ii) the orientation and position of the second image sensor device to point the second image sensor device in a second axial direction toward the object to capture the second image.

7. The system as in claim 6, wherein the controller hardware is further operable to control the first image sensor device and the second image sensor device such that an angle between the first axial direction and the second axial direction falls within a desired angular range.

8. The system as in claim 1, wherein the first image sensor device is disposed at a fixed location with respect to the object.

9. The system as in claim 1, wherein both the first image sensor device and the second image sensor device are airborne devices controlled to move in open space to capture the first image and the second image of the object.

10. The system as in claim 1, wherein the first orientation information, the first image, the second orientation information, the second image, and the measured distance is used to produce a stereo view of the object.

11. The system as in claim 1, wherein the measurement hardware is operable to measure the distance of separation between the first image sensor device and the second image sensor device based on conveyance of wireless communications between the first image sensor device and the second image sensor device.

12. A method comprising:
receiving first orientation information indicating an orientation of a first image sensor device capturing a first image of an object;
receiving second orientation information indicating an orientation of a second image sensor device capturing a second image of the object, the first image and the second image simultaneously captured at a given instant of time;
determining a distance of separation between the first image sensor device and the second image sensor device at the given instant of time of the first image sensor device capturing the first image and the second image sensor device capturing the second image; and
utilizing a combination of the first orientation information, the second orientation information, and the determined distance of separation to produce a surface rendition of the object via the first image and the second image.

13. The method as in claim 12 further comprising:
synchronizing the first image sensor device and the second image sensor device to capture the first image and the second image at the given instant of time.

14. The method as in claim 12, wherein the first orientation information indicates roll, pitch, and yaw settings of the first image sensor device at the given instant of time of the first image sensor device capturing the first image; and
wherein the second orientation information indicates roll, pitch, and yaw settings of the second image sensor device at the given instant of time of the second image sensor device capturing the second image.

15. The method as in claim 12 further comprising:
measuring the distance of separation between the first image sensor device and the second image sensor device based on wireless communications between the first image sensor device and the second image sensor device.

16. The method as in claim 12 further comprising:
to capture multiple images of the object including the first image and the second image, controlling both i) the orientation and position of the first image sensor device and ii) the orientation and position of the second image sensor device.

17. The method as in claim 12 further comprising:
dynamically controlling the orientation and position of the first image sensor device to point the first image sensor device in a first axial direction toward the object to capture the first image; and
dynamically controlling the orientation and position of the second image sensor device to point the second image sensor device in a second axial direction toward the object to capture the second image.

18. The method as in claim 17, wherein the controller hardware is further operable to control the first image sensor device and the second image sensor device such that an angle between the first axial direction and the second axial direction falls within a desired angular range.

19. The method as in claim 12, wherein the first image sensor device is disposed at a fixed location and orientation with respect to the object.

20. The method as in claim 12, wherein both the first image sensor device and the second image sensor device are airborne devices controlled to move in open space to capture the first image and the second image of the object.

21. The method as in claim 12, wherein utilizing the combination of the first orientation information, the second orientation information, and the determined distance of separation to produce the surface rendition of the object includes:
via triangulation, determine respective positions of the first image sensor device and the second image sensor device with respect to the object at the given instant of time.

22. The method as in claim 12, wherein the surface rendition of the object is a three-dimensional view of the object.

23. The method as in claim 22 further comprising:
for each set of images of the object simultaneously captured by the first image sensor device and the second image sensor device, storing a corresponding distance value indicating a respective distance between the first image sensor device and the second image sensor device.

24. The method as in claim 12, wherein determining the distance of separation between the first image sensor device and the second image sensor device includes:
    receiving the determined distance from the second image sensor device, the determined distance generated by the second image sensor device, the determined distance information indicating a magnitude of a separation between the first image sensor device and the second image sensor device.

25. The method as in claim 12, wherein utilizing the combination of the first orientation information, the second orientation information, and the determined distance to produce the surface rendition of the object includes:
    via triangulation, determine a respective position of the object with respect to the first image sensor device and the second image sensor device.

26. The method as in claim 12 further comprising:
    utilizing the combination of the first orientation information, the second orientation information, and the determined distance to track movement of the object over time.

27. The method as in claim 12, wherein the first image of the object is captured with respect to a first perspective center;
    wherein the second image of the object is captured with respect to a second perspective center; and
    wherein the determined distance of separation indicates a magnitude of a span between the first perspective center and the second perspective center.

28. The method as in claim 27, wherein utilizing a combination of the first orientation information, the second orientation information, and the determined distance of separation to produce the surface rendition of the object includes:
    detecting a first region in the first image of the object, the first region representing a point on the object;
    detecting a second region in the second image of the object, the second region representing the point on the object.

29. The method as in claim 28 further comprising:
    utilizing the first region and the second region as a basis to determine a location of the point on the object in three dimensional space.

30. The method as in claim 29 further comprising:
    using the determined location of the point on the object to produce the surface rendition of the object; and
    determining the location on the point on the object via triangulation.

31. Computer-readable storage hardware having instructions stored thereon, the instructions, when carried out by computer processor hardware, cause the computer processor hardware to:
    receive first orientation information indicating an orientation of a first image sensor device capturing a first image of an object;
    receive second orientation information indicating an orientation of a second image sensor device capturing a second image of the object, the first image and the second image simultaneously captured at a given instant of time;
    determine a distance of separation between the first image sensor device and the second image sensor device at the given instant of time of the first image sensor device capturing the first image and the second image sensor device capturing the second image; and
    utilize the first orientation information, the second orientation information, and the distance information to derive a 3-D view of the object using the first image and the second image.

\* \* \* \* \*